United States Patent Office 3,677,897
Patented July 18, 1972

3,677,897
LIVE LACTIC ACID BACTERIA CULTURES AND
PROCESS OF PRODUCING SAME
George A. Jeffreys, 219 Valleydale Ave.,
Salem, Va. 24153
No Drawing. Filed Aug. 31, 1970, Ser. No. 68,520
Int. Cl. C12k 3/00; A21d 8/04
U.S. Cl. 195—55
22 Claims

ABSTRACT OF THE DISCLOSURE

Lactic acid bacteria cultures each comprising a lactic acid bacteria cultured in a nutrient medium, an acetylated monoglyceride coating on said cultured bacteria, and a carrier blended with said coated bacteria, said carrier selected from a group consisting of glucose, modified cellulose, and modified starches.

The cultures are produced by (1) culturing the lactic acid bacteria in a culture medium or broth to develop substances that accelerate fermentation, enhance flavor, improve keeping qualities of fermented products and fermentation liquids, and promote a healthy intestinal environment, (2) preserving the cultured bacteria by emulsifying and coating them with an acetylated monoglyceride, (3) then blending them with an appropriate carrier containing glucose, modified cellulose and modified starches within the process, and (4) drying the resultant product under low temperature to encapsulate the lactics with the acetylated monoglyceride, thereby providing a lactics with the acylated monoglyceride, thereby providing a long shelf life of the culture and an improved stability in food mixtures.

This invention relates to a method of culturing and preserving lactic acid bacteria for use as a starting culture in various fermentation processes.

In many fermentation processes, it is desirable that lactic and other organic acids be initiated and maintained as soon as possible, such as in making yeast raised doughs, silage, pickle and olive fermentations, liquid ferments for animal feeds, and similar processes.

In modern conventional practices of making bread and rolls, flavor and character are often lacking. This is due in a large measure to mass production methods which decrease fermentation time, restrict the full use of flour until the end, and limit the use of character products such as milk. All these factors do not permit the full development of the so-called lactics that, in action with the yeast, produce flavor and substances that keep the bread and rolls from spoiling. The age old custom of our forefathers and old countries, whereby the sour dough from a previous lot of dough was used as a starting culture for a new lot of bread, has been completely forsaken.

If mass production methods are to be retained, the solution is to introduce live lactic acid bacteria in sufficient numbers at the start and accelerate fermentation with an active catalyst.

In making pickles, olives and sauerkraut, it is important that the right acids be developed which will preserve and have the right flavor. The initiation of lactic acid and propionic acid in silage as soon as possible will retard spoilage. In the production of grain alcohol, the souring of a mash previous to fermentation for alcohol is important. A proper lactic inoculation with accelerating substances is most desirable.

It is therefore an object of this invention to provide a culture of live active bacteria and a process of producing it wherein the bacteria is cultured in a medium and then coated while in liquid suspension by emulsifying the medium with food emulsifiers such as acetylated monoglycerides.

It is another object of this invention to provide a process of making a preserved dried culture of live lactic acid bacteria on a carrier of food ingredients which culture, when inoculated into a suitable liquid, will immediately initiate a desirable fermentation.

Another object of this invention is to provide a preserved dried culture of live lactic bacteria which, when incorporated into dough, will immediately become active with yeast and produce the desired flavor and substances that retard spoilage.

Another object of this invention is to provide a process of making a preserved dried culture of live lactic bacteria that will initiate a healthy environment in the intestines of man or animals; and also improve the feed efficiency in animals with consequent greater weight gains and thus replace antibiotics.

A further object of this invention is to provide substances that will accelerate yeast fermentation and reduce the leavening time of dough to permit the use of fast production methods with results equivalent to those of a long fermented dough.

A still further object of this invention is to provide a process of making a stable dried culture of lactics adapted for various fermentation processes that require the development of organic acids such as in making grain alcohol, pickles, olives, sauerkraut, silage, and liquid ferments for animal feeds.

Yet another object of this invention is to provide a dried stable culture of lactics and accelerating substances by coating them with an emulsifier that has a waxy character and having a melting point below the thermal death point of the lactics.

The lactics used in my process are well known in the dairy and fermentation industries, such lactics being indigenous in a healthy intestinal environment of man and animals. I employ two classes of lactic bacteria, namely, (1) that class of bacteria that grows at relatively high temperatures as between 40° C. and 50° C., and (2) the class that grows at body temperature or lower, that is, 36° C. to 25° C.

The high and low temperature lactics regularly used in the dairy and fermentation industries include *Lactobacillus delbrueckii, Lactobacillus bulgaricus, Lactobacillus thermophilius, Lactobacillus plantarum, Lactobacillus lactis, Leuconostoc dextranicum, Leuconostoc citrovorum, Streptococcus lactis, Streptococcus cremoris* and others of this type; and those bacteria in healthy intestinal environment of animals, such as *Lactobacillus bifidus, Lactobacillus acidophilus* and others of this type. Any of these lactics can be used singly or in a combination of two or more.

A growth media or broth for culturing lactics is prepared with sterile water or milk into which is dissolved and suspended a number of basic ingredients that promote growth of the lactics. The preferred ingredients for such media are skim milk, whey, dextrose, tomato juice, extract of brewers yeast, and grain products such as flour, gluten and substances that stimulate fermentation including extracts of grain coatings of wheat bran, rice bran, corn bran and the like. Also included may be extracts of certain fungal cultures grown on grain coatings such as *Aspergillusoryzae, Aspergillus niger, Rhizopus oligosporus,* the latter being used to produce tempeh, a national food of Indonesia. In addition to the above, certain salts are used such as sodium chloride, and buffers such as monocalcium phosphate and calcium carbonate. The total solubles in the media should not exceed 16% and sugars 6% to 8% by weight. For some applications, as for acidophilus milk, skim milk or whole milk, a principal substrate is preferred.

It should be noted that all ingredients used in the lactic broth or culture medium either meet the Federal Drug Administration (FDA) standards or are completely utilized by the lactics during multiplication and are no longer present as such in the final product. For example, yeast is grown on molasses, but molasses is not present in the final yeast product. Likewise, wheat bran and tomato juice may be used, but are not present in the final product as such.

The extracts of grain coatings, such as wheat bran and fungal cultures grown on grain coatings, are produced by countercurrent extraction with water by the Shanks Process. The extract is then Seitz filtered, or filtered by any other filtration process which will eliminate all contaminating bacteria. The soluble solids are calculated on the basis of a Brix hydrometer reading; for example, 100 grams of wheat bran will produce approximately 30 grams of soluble solids. Thirty grams of soluble solids are supplied by approximately 300 grams of extract at 10 degrees Brix. Also 100 grams of fungal culture of *Aspergillus oryzae* grown on wheat bran will produce 40 grams of soluble solids or 400 milliliters (mls.) of extract at 10 degrees Brix.

This extract may be added in any proportion to the culture medium as to add approximately 5% by weight dissolved solids to the culture medium. For example: 800 mls. of complete culture medium would contain 5% dissolved solids from the extract alone or 400 mls. of extract at 10 degrees Brix which would yield 40 grams of solids (that is, 5% of 800 grams).

When the thermophilic count of the wheat bran or fungal culture is negligible, either one or both can be added directly to the broth without extracting, and then the suspended solids are strained or filtered out after culturing. By using this direct method, a more efficient and economical fermentation and extraction is obtained.

The selected ingredients are thoroughly blended with water and then heated to between 54° C. and 60° C. for 10 minutes. This heating has a two-fold purpose: (1) the mesophilic or low temperature contaminating bacteria are killed off, and (2) any enzyme inhibitors that would retard fermentation are inactivated. The temperature is not high enough or long enough to affect the desired enzymes.

The culture medium is cooled to a temperature range of 34° C. to 46° C., and the specific temperature adjusted according to the type of lactics to be grown. For low temperature lactics, this should not be above 37° C. and for high temperature lactics from 42° C. to 50° C. The pH is adjusted to between 4.6 and 5.2.

The inoculating culture consists of a 24 to 48-hour active broth culture of the desired lactics, either singly or in combinations of two or more. The inoculating broth can also be part of a previous plant run which, in some cases, is desirable since the lactics have become acclimatized to the particular substrate. The amount of inoculating culture can be from 1 to 5% of the total broth by weight.

The whole broth is now cultured from 24 to 48 hours at the appropriate temperature. For low temperature lactics, this would be from 30° C. to 37° C. for 48 hours; and for high temperature lactics from 40° C. to 48° C. from 24 to 30 hours. Since most of the desired lactics are microaerophilic, only light agitation is used. By the end of the culture period, the pH will have dropped to 3.5 to 3.6.

If the medium is made with whole bran or mold bran, the bran hulls are separated from the medium with a centrifuge, or strained through a fine screen. The hulls still retain about one-third of the liquid, most of which is removed by a simple sparging or washing with sufficient warm water until the original volume of cultured medium is reached. However, for some applications such as for silage and ferments for animal feed, the hulls are desirable and may be left in. The above procedure is employed in lieu of adding a filtered extract to a medium of whole or mold bran.

Most lactics gradually die off when dried. I have found that the latics can be preserved for a long time by having the carrier develop a concentrated solution of dextrins and glucose while drying. This is accomplished by including in the dry carrier suitable modified starches, modified cellulose, and dextrose. As the material dries, the modified starches, modified cellulose and sugars become concentrated and assume a preservative action on the coated lactics.

I have also discovered that the lactic organisms can be coated while still in broth suspension. The compounds most suitable for producing a protective coating in this manner are acetylated monoglycerides that have melting points from 35° C. to 45° C. The medium is first adjusted to a pH of 4.6 to 5.6 with addition of calcium carbonate. The temperature is next raised to one or more degrees above the melting point of the emulsifier to be used. The emulsifier is melted and held at a temperature slightly above its melting point, and is then incorporated into the cultured medium in a continuous stream with brisk agitation until an emulsion is formed. The amount of emulsifier used should be from 1% to 8% by weight. Agitation is continued from 2 to 5 minutes and then milder agitation is used until the medium or broth is blended with the carrier as later described. The emulsion will remain stable for several hours without harm to the lactics.

The emulsifiers that have proved most efficient for my purpose are Myvacet 5–00 with a melting point of 40° C. to 43° C. and Myvacet 7–00 and 7–07 with a melting point of 36° C. to 40° C. and which upon cooling form a protective waxy film. Myvacet 5–00, 7–00 and 7–07 are commercially available from the Tennessee Eastman Company, a division of Eastman Kodak Company, Rochester, N.Y.

When the emulsified medium is blended with the carrier, the lactics become coated upon cooling and, in turn, become surrounded by the concentrated glucose as the blended mixture dries. This preserves the lactics as demonstrated by a series of assays on coated and uncoated mixtures.

The final emulsified culture medium is blended on a carrier of suitable ingredients that have been approved by the FDA. For human use, the mixture should be sterilized with steam and then cooled. The steaming and cooking operation can be performed continuously with suitable equipment that is well known to those skilled in the art.

To provide a suitable carrier for the culture medium, the following formula was used; however, any food ingredients having similar physical characteristics can be used.

1000 parts

| | |
|---|---|
| 100 whey solids | 10 monocalcium phosphate |
| 200 flour | 10 calcium carbonate |
| 300 starch | 10 skim milk powder |
| 250 white corn meal | 50 tricalcium phosphate |
| 60 dextrose | 10 salt (NaCl) |

The proportion of cultured medium to dry carrier depends on the formula and absorption factor. Based on a dry mix such as above, this proportion should be about one of the medium to 1.8 of carrier. On some applications where lactic fermentation is an intermediate step, a more highly absorbent ingredient such as diatomaceous earth, Avicel, gelatinized starches, cellulose gum, and the like can be used to produce a more concentrated product. Avicel is a micro-crystalline cellulose, commercially available from the American Viscose Division of the FMC Corporation, Philadelphia, Pa.

The object is to get a blend that will form into lumps or pieces about the size of a bean. For quick drying, the blend can be extruded through a screen or die in the form of pellets. This permits fast drying by the fluidized bed method, or by any known method which dries the product at a temperature that will not permit the temperature of the product to exceed 110° F.

To determine the effectiveness of the coating procedure with acetylated monoglyceride on the keeping qualities of the lactics, lactic cultured medium was divided into two equal portions, one portion being coated by emulsifying and the other left as is. Both portions were blended and dried on a carrier. At stated intervals, assays were made for viable lactics as shown in Table I. It will be seen that after an extended period of time, a larger proportion of the lactics in the coated samples remained viable. Accordingly, the shelf life of the coated culture is much greater than of the uncoated.

TABLE I

| Run Number: | Percent myavcet of broth | Age of sample (days) | Coated sample of lactics (viable count per gram), million | Uncoated sample of lactics (viable count per gram), million |
|---|---|---|---|---|
| 45 | 8 | 7 | 37 | 6 |
| 54 | 5 | 7 | 47 | 20 |
| 56 | 5 | 4 | 24 | 12 |
| 57 | 5 | 3 | 6 | 2 |
| 60 | 5 | 5 | 130 | 25 |
| 70A | 5 | 106 | 36 | 4 |
| 73 | 5 | 3 | 160 | 100 |
| 73 | 5 | 97 | 39 | 7 |
| 74 | 5 | 1 | 130 | 90 |
| 74 | 5 | 94 | 67 | 1.6 |
| 77 | 5 | 14 | 120 | 80 |

The dried culture so produced can be used in any yeast raised dough in the amount of 0.5 to 2.0% by weight based on the flour. Where a short fermentation time is used or desired, the higher 2% is preferable. A long fermentation time would take from 0.5 to 1%. The culture can either be added directly to the flour, or first suspended in water and blended into the flour.

The following examples illustrate the invention, but do not in any way limit its scope:

EXAMPLE I 300 mls. wheat bran extract at 10 degrees Brix
500 mls. water
12 gms. whey solids
6 gms. skim milk solids
36 gms. dextrose powder
2 gms. brewers yeast
6 gms. wheat flour
4 gms. monocalcium phosphate
4 gms. calcium carbonate
8 mls. concentrated extract of a culture *Aspergillus oryzae*

Total volume was 930 mls., pH 5.1.

The mixture was stirred and heated to 54° C. for ten minutes, cooled to 34° C., and then inoculated with the following cultures:

6 mls. of 48-hour *Lactobacillus delbreuckii* broth culture
100 mgs. vacuum dried cultures of *Lactobacillus bulgaricus* and *Streptococcus lactis*
100 mgs. vaccum dried *Lactobacillus thermophilus* culture
10 mls. culture medium from a similar previous lot The culture medium was held at 34° C. for an hour and then placed in a water bath at 43° C. to 45° C. with mild agitation. Since the lactics are mostly microaerophilic, seration was not necessary.

By the end of 18 hours, the pH had dropped to 3.7. Microscopic examination showed typical lactic organisms.

The cultured medium was then neutralized to pH 4.6 by the addition of 6 grams of calcium carbonate with stirring. Myvacet 7-00 (acetylated monoglyceride) which has a melting point of 36° C. to 40° C., was then used to produce an emulsion with the culture. 45 grams of acetylated monoglyceride was melted and adjusted to 45° C. This was added to the culture with vigorous blending which produced an emulsion that kept stable with mild agitation at approximately 41° C.

The emulsion was then blended with a dry carrier in such proportion that it produced a lumpy moist material. A lumpy or pelleted products permits circulation of air which dries the product quickly at low temperatures either on perforated trays or by the fluid bed drying method.

Temperature of air was so adjusted that it prevented the material from exceeding 105° F. As the material dried, the dextrose solution became more viscous and, along with the acetylated monoglyceride, encased the bacteria with a protective coating.

The material dried in 1½ hours. It was then cooled and comminuted to granular state. The lactics and enzymes in the culture remained viable and potent for extended periods as long as several months without refrigeration as shown in Table I above. Equally good results were realized in fermentation tests.

EXAMPLE II

The procedure in Example I was repeated on a plant scale using an entire mold culture of *Aspergillus oryzae* on the wheat bran. The thermophilic count on this culture was low, it being less than 100 per gram. An enzyme assay showed it to contain about 300 SKB units per gram of amylase.

The following nutrient medium was made:

|   | Lbs. |
|---|---|
| Water | 400 |
| Mold bran culture | 50 |
| Whey solids | 6 |
| Skim milk solids | 3 |
| Dextrose powder | 18 |
| Brewers yeast | 1 |
| Wheat flour | 3 |
| Monocalcium phosphate | 2 |
| Calcium carbonate | 2 |
| Tomato juice | 0.5 |

The suspended mixture was stirred and pasteurized by heating to 54° C. for ten minutes. The mixture was cooled to 34° C. and then inoculated as follows:

1000 mls. from a previous similar lactic culture, and
1000 mls. of 48-hour *Lactobacillus delbrueckii* broth The inoculated mixture was held at 34° C. for one hour and then heated to 44° C. with mild agitation. It was held at the latter temperature with mild agitation for 24 hours, at which time the pH had dropped to 3.6.

The whole cultured medium was stirred briskly and pumped through a juice extractor with a fine screen. About 300 lbs. of extract was obtained. The residue of bran hulls was washed by sparging and added to the medium until a volume of 400 lbs. was reached. Then 2½ gallons of a mixed culture of low temperature lactics was added and blended in. The medium was warmed to 42° C., then emulsified with 20 lbs. of acetylated monoglyceride, blended on a carrier of bread ingredients, and dried at a low temperature.

Example II demonstrates that the culture can be produced on a plant scale and, moreover, that the whole culture may be used rather than the extract as used in Example I.

EXAMPLE III

The entire mold culture of *Aspergillus oryzae* grown on wheat bran was extracted with water by countercurrent extraction. The concentrated extract was diluted to 4 degrees Brix and then Seitz filtered which produced a bacteria free filtrate.

The following nutrient media was prepared:

500 mls. extract at 4 degrees Brix
3 gms. skim milk solids
6 gms. whey solids
18 gms. dextrose powder
2 gms. brewers yeast
1 gm. monocalcium phosphate
2 gms. calcium carbonate
5 gms. wheat gluten
2 gms. wheat flour
1 gm. tomato juice
0.5 gm. ammonium sulfate
16.5 gms. NaCl A higher percentage of sodium chloride was used in the medium since *Lactobacillus plantarum* is resistant to the salt, and this promotes better fermentation. The mixture was stirred, then heated to 54° C. for ten minutes, cooled to 34° C., and then inoculated with 15 mls. of a 48-hour broth culture of *Lactobacillus plantarum*.

The medium was incubated in water bath at 37° C. for another 24 hours. The pH by the end of this time had dropped to 3.6. To the cultured medium was then added 2 gms. of calcium carbonate with mild stirring, and then gradually heated to 44° C.

Thirty-six grams of acetylated monoglyceride was melted and the temperature adjusted to 45° C. This was stirred into the cultured medium with vigorous blending which produced an emulsion that kept stable with mild agitation at approximately 41° C.

A dry mixture was prepared as follows:

Parts by weight

| | |
|---|---|
| 10 whey solids | 10 milk |
| 10 malt flour | 10 dextrose powder |
| 20 flour | 10 tricalcium phosphate |
| 20 Avicel | 1 calcium carbonate |
| 8 cellulose gum | 1 monocalcium phosphate |

The mixture was sterilized by adding 15 parts of water and steaming to 95° C. This was then cooled to 37° C.

The emulsion was now blended with the above mixture in such proportion that it produced a lumpy moist material. The proportion was 1 of cultured medium to 1.40 dry mix. The blended material was dried on a perforated tray using the fluid bed drying method in which the material did not exceed 110° F. while drying.

As will be seen in Example VII, hereinafter discussed, the final product of this example may be used to promote a superior sauerkraut fermentation.

EXAMPLE IV

A dried culture to promote health and feed efficiency in animals

The entire dried mold culture of *Aspergillus oryzae* on wheat bran was used as part of the broth to provide the stimulating factors and essential substances needed for good lactic growth.

The following nutrient medium was made for a plant scale basis:

| | Lbs. |
|---|---|
| Water | 400 |
| Mold bran culture | 50 |
| Whey solids | 10 |
| Skim milk solids | 10 |
| Dextrose powder | 20 |
| Brewers yeast | 2 |
| Wheat reddog flour | 5 |
| Monocalcium phosphate | 1 |
| Calcium carbonate | 2 |
| Tomato juice | 2 |
| Sodium chloride | 3 |

The suspended mixture was stirred and pasteurized by heating to 56° C. for ten minutes. The mixture was cooled to 34° C. and then inoculated by blending into:

1000 mls. actively growing 24-hour broth culture of *Lactobacillus bifidus*, and
1000 mls. actively growing 24-hour broth culture of *Lacbaillus acidophilus*

The inoculated medium was incubated at 37° C. for 30 hours without stirring since both organisms are microaerophilic. The pH by the end of this time had become 3.8. To the cultured medium was added 4 lbs. calcium carbonate with mild stirring and then gradually heated to 42° C.

Sixteen pounds of acetylated monoglyceride (Myvacet 7–00) was melted and the temperature adjusted to 44° C. This was stirred into the neutralized cultured medium, resulting in an emulsion that kept stable with mild agitation at 41° C.

A dry mix was prepared as follows:

Parts by weight 550 wheat bran
100 corn meal
100 reddog
100 *Aspergillus oryzae* mold culture on wheat bran
20 skim milk solids
20 dextrose powder
50 tricalcium phosphate
10 brewers yeast
10 monocalcium phosphate
10 calcium carbonate
10 salt (NaCl)
10 purified gums
10 whey solids The mixture was continuously steamed to a temperature of 95° C. for ten minutes and then cooled to 35° C., and continuously blended in the proportion: 1 of emulsified medium to 1.2 of sterilized carrier. The blended material was dried on perforated trays at a temperature which did not exceed 109° F. of the material.

This product, when blended in feeds of ¼ of 1% to 1% by weight, establishes a healthy intestinal environment in livestock.

Typical purified gums in the above dry mix are guar, cellulose, methylcellulose and carboxymethyl cellulose gums.

EXAMPLE V

The following procedure was used to produce a stable dried culture of *Lactobacillus acidophilus* that could be used as a source of inoculum for acidophilus milk.

Substrate formula 100 mls. Aspergillus mold extract at 4 degrees Brix, Seitz filtered
400 mls. whole milk
10 gms. whey solids
20 gms. dextrose
1 gm. tomato juice
1 gm. brewers yeast
1 gm. monocalcium phosphate
2 gms. calcium carbonate
3 gms. NaCl This mixture was stirred, then heated to 65° C. for 15 minutes, cooled to 36° C., then inoculated with 25 mls. of 24-hour broth culture of *Lactobacillus acidophilus*.

The medium was incubated at 37° C. for approximately 30 hours without stirring. The pH by this time had become 3.6.

To the medium was added 4 gms. of calcium carbonate with mild stirring. This raised the pH to 4.6.

To the medium was now blended in 20 mls. of centrifuged cells from 500 mls. of a 24-hour broth culture of *Lactobacillus acidophilus*.

20 grams of acetylated monoglyceride (Myvacet 7–00) was melted and the temperature adjusted to 44° C. This was stirred into the medium with blending which produced an emulsion that kept stable with mild agitation at 41° C.

A dry mix was prepared as follows:

Parts by weight

| | |
|---|---|
| 27 corn starch | 2 whey solids |
| 20 white flour | 10 tricalcium phosphate |
| 20 gelatinized starch | 3 monocalcium phosphate |
| 5 dextrose | 1 sodium chloride |
| 5 high temperature malt | 5 cellulose gum |
| 2 skim milk solids | |

To the mixture was blended in 15 mls. water, and then sterilized with steam to 90° C. for 10 minutes.

After cooling, the mixture was blended with the emulsified medium in the proportion: 1 of emulsified medium to 1.2 of carrier.

The blended material was dried by the fluid bed drying method in which the temperature of the material did not exceed 102° F.

When this dried culture is added to pasteurized whole milk and cultured for 24 hours at from 30° C. to 37° C., a typical acidophilus specialty milk is produced in a simpler manner than has been produced heretofore by freeze dried or liquid cultures, thus making it available for home use.

EXAMPLE VI

Samples of the dried cultures in Examples I and II of this invention were tested on bread making by the following technique:

Straight short time dough process

| | |
|---|---|
| 600 | gms. white flour |
| 12 | gms. NaCl |
| 20 | gms. sucrose |
| 20 | gms. non-fat milk solids |
| 20 | gms. shortening |
| 2 | gms. yeast food |
| 18 | gms. compressed yeast |
| 6 | gms. dried culture from Example II |
| 392 | mls. water at 85° F. |
| 1090 | |

The ingredients were placed in a McDuffee Bowl of a Hobart Mixer and mixed for one minute at No. 1 speed, and then 5 minutes at No. 2 speed. The dough was then removed and placed in a fermentation box with a temperature of 85° F. The dough was punched down three times at 15 minute intervals and was removed after a period of 70 minutes. It was then placed in the McDuffee Bowl again and mixed at No. 2 speed for 4½ minutes and at high No. 3 speed for ½ minute. The dough was allowed to rest 4 minutes and then divided into two portions. Each portion was molded and placed in a bread pan and transferred to a proof box having a temperature of 105° F. and allowed to proof for one hour. The proofed dough was then baked for 25 minutes at 410° F. Subsequently, the bread was allowed to cool for one hour.

Each loaf was then placed in a polyethylene bag and stored at room temperature.

Similar tests were made using the dry culture for Example I and Example II and a mix for control in which no culture was used.

The breads so baked were scored and compared against bread baked by conventional methods. Bread baked with dried culture from Example II scored highest in volume and flavor surpassing the control. Bread baked with culture from Example I was similar to conventional bread as may be seen in Table II illustrating conventional methods of judging bread quality.

EXAMPLE VII

The predominant organism of a normal sauerkraut fermentation is *Lactobacillus plantarum*. The preserved culture from Example III was used in a sauerkraut fermentation trial. This culture with fermentation accelerating factors produced a swift fermentation of desired organisms.

Short time sauerkraut fermentation trial 4500 grams of previously wilted and washed cabbage (wilted outer leaves removed)

113 grams NaCl (2.5% by weight)

The cabbage was shredded in a long narrow shred as it is normally before fermenting, and then divided into two lots:

(1) A control lot which was mixed with 2.5% salt only and placed in ½ gallon jar, pressed down tightly, covered with the wilted outer leaves previously removed, and weighted so that brine covered the surface of the cabbage, and (2) An improved lot which was mixed with 2½% salt as before and then mixed with 2% dried *Lactobacillus plantarum* culture. The shred was pressed and covered as above.

These jars were placed in a room, maintaining temperature between 70° F. and 78° F. Utensils and jars were kept clean but not sterile to duplicate regular plant operations and results.

Samples were removed with sterile pipettes, and records were kept of pH, appearance, microbial population and titratable acidity (lactic acid) for these ferments.

As can be seen from the observations in the Sauerkraut Fermentation Test, Table III, the improved method helps to prevent spoilage in early stages of sauerkraut fermentation by quickly establishing a population of desired lactics, increased production of lactic acid, and lowering of the pH.

Overall fermentation time is shortened slightly, and the final yield of suitably fermented sauerkraut is greater than in the control.

TABLE III.—SAUERKRAUT FERMENTATION TEST

| | 1. Control sauerkraut (made by conventional method) | 2. Improved sauerkraut (using dried culture method) |
|---|---|---|
| 24 hours | pH 6.0. Population made up of gram negative rods, many yeasts, and a few gram positive rods. Appearance generally good, much gas being produced. | pH 4.3. Population made up of a few yeasts, but mostly gram positive rods, typical lactobacilli. Some gas being produced, good appearance. |
| 48 hours | pH 4.6. Contained yeasts, gram positive rods, with a few gram negative rods, some gas being produced. .50% lactic acid. | pH 3.3-3.4. Gram positive rods, no gas. 1.0% lactic acid. |
| 72 hours | pH 3.5-3.7. .69% lactic acid. | pH 3.2. 1.05% lactic acid. |
| 168 hours | pH 3.2-3.4. 1.15% lactic acid. | pH 3.2 or below. 1.3% lactic acid. |
| 196 hours | pH below 3.2. 1.4% lactic acid. Very good appearance, some spoilage at top of packing. | pH below 3.2. 1.6% lactic acid. Very good appearance, Less spoilage at top. |
| Overall results. | Very good. | Excellent results in less time and fewer contaminant (potential spoilage) organisms present. |

TABLE II.—SCORE OF BREAD MADE IN EXAMPLE VI, GENERAL COMPARABLE CHARACTERISTICS

| | Volume, cu. in. | Oven spring | Shred | Age | Crumb | Flavor | Flavor after 5 days |
|---|---|---|---|---|---|---|---|
| Example: | | | | | | | |
| I | 2,510 | XXX | Even | Good | Good | Good | Good. |
| II | 2,625 | XXXX | Smooth | Very good | do | Excellent | Excellent. |
| Control | 2,210 | X | Rough broken | Fair | Fair | Fair | Poor. |
| Conventional 5-hr. sponge | 2,520 | XXX | Even | Good | Good | do | Fair. |

NOTE.—X marks degree of quality, e.g. 1-X poor, XXXX best.

I claim:

1. A culture of active lactic acid bacteria comprising: lactic acid bacteria cultured in a nutrient medium, a coating of acetylated monoglyceride on said bacteria, and a carrier selected from a group consisting of modified cellulose and modified starches, said carrier being blended with said coated lactic acid bacteria.

2. A lactic acid bacteria culture as defined in claim 1 wherein said nutrient medium contains soluble bran solids extracted from wheat bran.

3. A lactic acid bacteria culture as defined in claim 1 wherein said nutrient medium contains purified fungal amylase enzymes derived from *Aspergillus oryzae* and combined with soluble wheat bran solids.

4. A lactic acid bacteria culture as defined in claim 3 wherein said nutrient medium has a low thermophilic count.

5. The process of producing a culture of live lactic acid bacteria comprising the steps of culturing the bacteria in a nutrient medium, coating said cultured bacteria while in liquid suspension by emulsifying the medium with acetylated monoglyceride, and then blending said coated lactic acid bacteria with a carrier selected from a group consisting of modified cellulose and modified starches.

6. The process as defined in claim 5 wherein the lactic acid bacteria is cultured in said medium at a temperature ranging from 25° C. to 50° C.

7. The process as defined in claim 5 wherein said nutrient medium contains soluble bran solids extracted from wheat bran.

8. The process as defined in claim 5 wherein said nutrient medium contains purified fungal amylase enzymes derived from *Aspergillus oryzae* and combined with soluble wheat bran solids.

9. The process as defined in claim 7 wherein said nutrient medium contains purified fungal amylase enzymes derived from *Aspergillus oryzae* and combined with soluble wheat bran solids.

10. The process as defined in claim 5 whrein the lactic acid bacteria is cultured in a medium containing a whole culture of *Aspergillus oryzae* grown on wheat bran and having a low thermophilic count, and comprising the further step of filtering out the bran solids.

11. The process as defined in claim 5 wherein the medium is inoculated with lactic acid bacteria selected from the group consisting of *Loctobacillus delbrueckii, Lactobacillus bulgaricus, Lactobacillus thermophilis, Lactobacillus lactis, Lactobacillus acidophilus, Lactobacillus plantarum, Streptococcus lactis,* and *Streptococcus cremoris.*

12. A process of producing a culture of live lactic acid bacteria comprising the steps of: culturing the bacteria in a nutrient medium; then coating the bacteria by emulsifying the medium with acetylated monoglyceride having a melting point ranging from 35° C. to 45° C.; blending the emulsified medium with a carrier of food ingredients that contain glucose, modified starches, and modified cellulose; and drying and cooling the blend to encapsulate the coated lactics, whereby a preserved dried culture with a long shelf life is provided.

13. The process as defined in claim 12 wherein the lactic acid bacteria is cultured in said medium at a temperature ranging from 25° C. to 50° C.

14. The process as defined in claim 12 wherein said nutrient medium contains soluble bran solids extracted from wheat bran.

15. The process as defined in claim 12 wherein said nutrient medium contains purified fungal amylase enzymes derived from *Aspergillus oryzae* and combined with soluble wheat bran solids.

16. The process as defined in claim 14 wherein said nutrient medium contains purified fungal amylase enzymes derived from *Aspergillus oryzae* and combined with soluble wheat bran solids.

17. The process as defined in claim 12 wherein the lactic acid bacteria is cultured in a medium containing a whole culture of *Aspergillus oryzae* grown on wheat bran and having a low thermophilic count; and comprising the further step of filtering out the bran solids.

18. The process as defined in claim 12 and comprising the further step of inoculating the medium with lactic acid batceria selected from the group consisting of *Lactobacillus delbrueckii, Lactobacillus bulgaricus, Lactobacillus thermophilis, Lactobacillus acidophilus, Lactobacillus plantarum, Streptococcus lactis, Streptococcus cremoris,* and *Lactobacillus bifidus.*

19. The process as defined in claim 12 wherein said food ingredients provide a combination of modified cellulose, modified starches, purified gums and glucose, said combination coating the lactics as the mixture dries.

20. The process as defined in claim 12 wherein said blended emulsified medium is extruded into lumps or pellets.

21. The process as defined in claim 17 wherein said blended emulsified medium is extruded into lumps or pellets.

22. The process as defined in claim 19 wherein said blended emulsified medium is extruded into lumps or pellets.

References Cited

UNITED STATES PATENTS 2,842,442  7/1958  Jeffreys _____ 99—90 X

FOREIGN PATENTS 457,729  6/1949  Canada.

LIONEL M. SHAPIRO, Primary Examiner

U.S. Cl. X.R.

195—56, 59, 96, 75; 99—2 G, 59, 90 R, 156